United States Patent
Engholm et al.

(10) Patent No.: US 7,184,406 B2
(45) Date of Patent: Feb. 27, 2007

(54) VISUALIZATION OF ACTIVE CODES, THEIR SPREADING FACTORS AND POWER LEVELS, IN A CODE DOMAIN POWER DISPLAY

(75) Inventors: Kathryn A. Engholm, Beaverton, OR (US); Xiaofen Chen, West Linn, OR (US)

(73) Assignee: Tektronix, Inc., Beaverton, OR (US)

( * ) Notice: Subject to any disclaimer, the term of this patent is extended or adjusted under 35 U.S.C. 154(b) by 897 days.

(21) Appl. No.: 09/967,555

(22) Filed: Sep. 28, 2001

(65) Prior Publication Data

US 2003/0063586 A1 Apr. 3, 2003

(51) Int. Cl.
*H04J 1/16* (2006.01)
(52) U.S. Cl. ........................................ 370/241
(58) Field of Classification Search ........... 370/241, 370/252, 335, 342; 324/223, 394; 340/915, 340/990, 995.1–995.27, 691.6, 461, 525; 341/175; 342/142, 176, 181–182; 345/440.1–440.2, 345/208–215, 1.1–1.2, 10–24; 455/566, 455/145–148, 154.2, 158.4; 385/440–443; 382/277, 285
See application file for complete search history.

(56) References Cited

U.S. PATENT DOCUMENTS

| | | | |
|---|---|---|---|
| 6,219,340 B1 | 4/2001 | Cutler et al. | |
| 6,317,435 B1 * | 11/2001 | Tiedemann et al. | 370/441 |
| 6,580,821 B1 * | 6/2003 | Roy | 382/285 |
| 6,600,776 B1 * | 7/2003 | Alamouti et al. | 375/147 |
| 6,850,238 B2 * | 2/2005 | Bryant et al. | 345/440.1 |
| 2003/0039264 A1 * | 2/2003 | Hando | 370/441 |

* cited by examiner

Primary Examiner—Doris H. To
Assistant Examiner—Thai Hoang
(74) Attorney, Agent, or Firm—Francis I. Gray; Michael A. Nelson

(57) ABSTRACT

A display of code domain power (CDP) for a code domain multiple access (CDMA) signal having multiple spreading factors is in the form of a three-dimensional graphic having as axes code domain power, code index and spreading factor to provide a visual indication of both power and spreading factor for active codes. Sub-codes of base codes may be identified by any suitable means, such as highlighting. Sub-codes may be suppressed and the power level of the base codes adjusted accordingly to represent the total power of the active codes.

12 Claims, 2 Drawing Sheets

VISUALIZATION OF ACTIVE CODES, THEIR SPREADING FACTORS AND POWER LEVELS, IN A CODE DOMAIN POWER DISPLAY

BACKGROUND OF THE INVENTION

The present invention relates to code division multiple access (CDMA) signal analysis, and more particularly to a visualization of active codes, their spreading factors and power levels, in a code domain power display.

In a CDMA signal using orthogonal codes, all of which are the same length (the length being known as "spreading factor"), the amount of power present in each code, i.e., code domain power (CDP), is displayed by plotting the power in each code versus the code number index on a two-dimensional column graph. This is a conventional and well-understood manner using linear index code order for displaying CDP information. Newer CDMA systems, such as cdma2000, now specify use of codes of varying spreading factors, i.e., of different lengths, which complicates the display of CDP. Specifically codes of smaller spreading factor, when displayed in a CDP graph that is appropriate for the code having the largest spreading factor, appear dispersed into multiple sub-codes at fixed distances determined by their relationship to the larger spreading factor code system, e.g., a cdma2000 code with a spreading factor of 16 when displayed on the code graph for a spreading factor of 128 has 8 sub-codes spaced 8 indices apart. Spreading factor is not visually apparent for any of the codes.

U.S. Pat. No. 6,219,340 describes one method of displaying power levels for a CDMA signal having orthogonal codes with different spreading factors or code layers. In this display a power level for each active code channel is displayed using a vertical bar, with the width of the bar indicating in which code layer each active code channel is active. Each code is rendered with a color to indicate spreading factor, but this method does not give an intuitive sense for the information because the colors don't directly convey a sense of magnitude or ordering.

Co-pending U.S. patent application Ser. No. 09/919,690, filed Jul. 31, 2001, presents another display for CDP where the sub-codes are grouped together by plotting them in bit-reversed index code order, equivalent to transforming a Walsh code indexing scheme into an orthogonal variable spreading factor indexing scheme. This scheme also does not convey a sense of magnitude or ordering.

What is desired is a means of visually indicating both power and spreading factor for each code, or sub-code, in a graph of code domain power for code domain multiple access systems having multiple spreading factors.

BRIEF SUMMARY OF THE INVENTION

Accordingly the present invention provides a visualization of active codes, their spreading factors and power levels, in a code domain power (CDP) display for a code domain multiple access (ODMA) signal having multiple spreading factors by adding a third dimension to the conventional CDP column graph of code power versus code index. The third dimension is depth with the maximum spreading factor being used to scale the depth axis. Each code index column height is proportional to the measured power for that code, and its depth or thickness is based on the spreading factor for the base code to which it belongs. Sub-codes may be identified by suitable means, such as highlighting, or may be suppressed. When sub-codes are suppressed the power levels of the base codes are adjusted to represent the total power for the active code.

The objects, advantages and other novel features of the present invention are apparent from the following detailed description when read in conjunction with the appended claims and attached drawing figures.

DETAILED DESCRIPTION OF THE INVENTION

Figure 1:
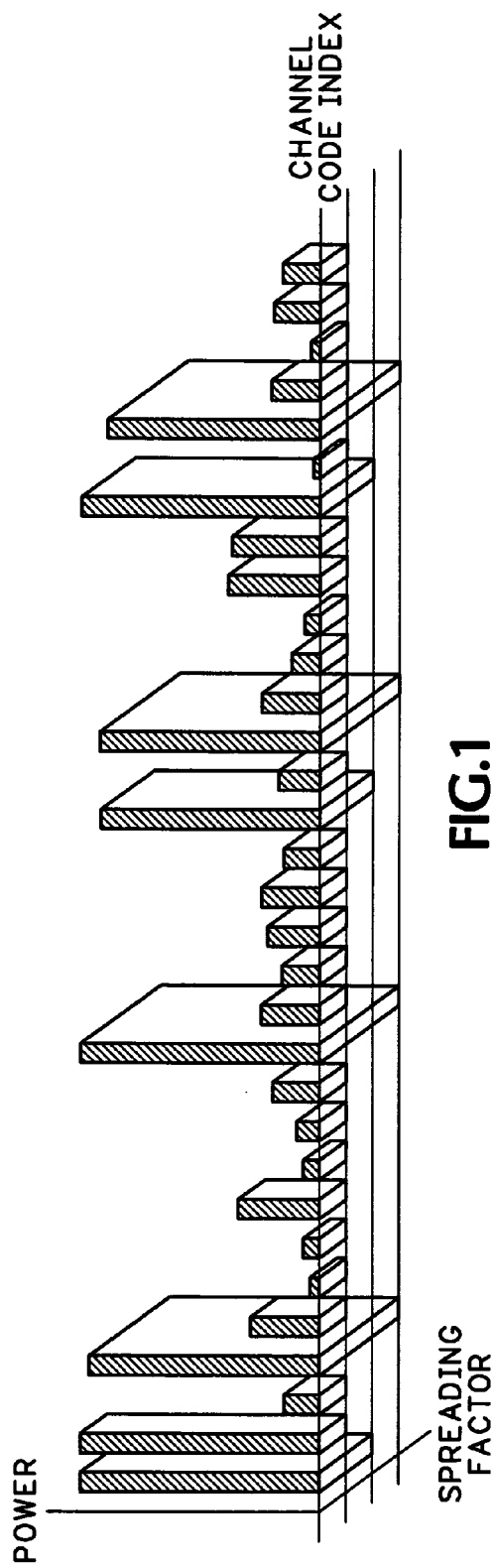
FIG. 1 is a graphic view of a three-dimensional CDP graph according to the present invention.
Figure 2:
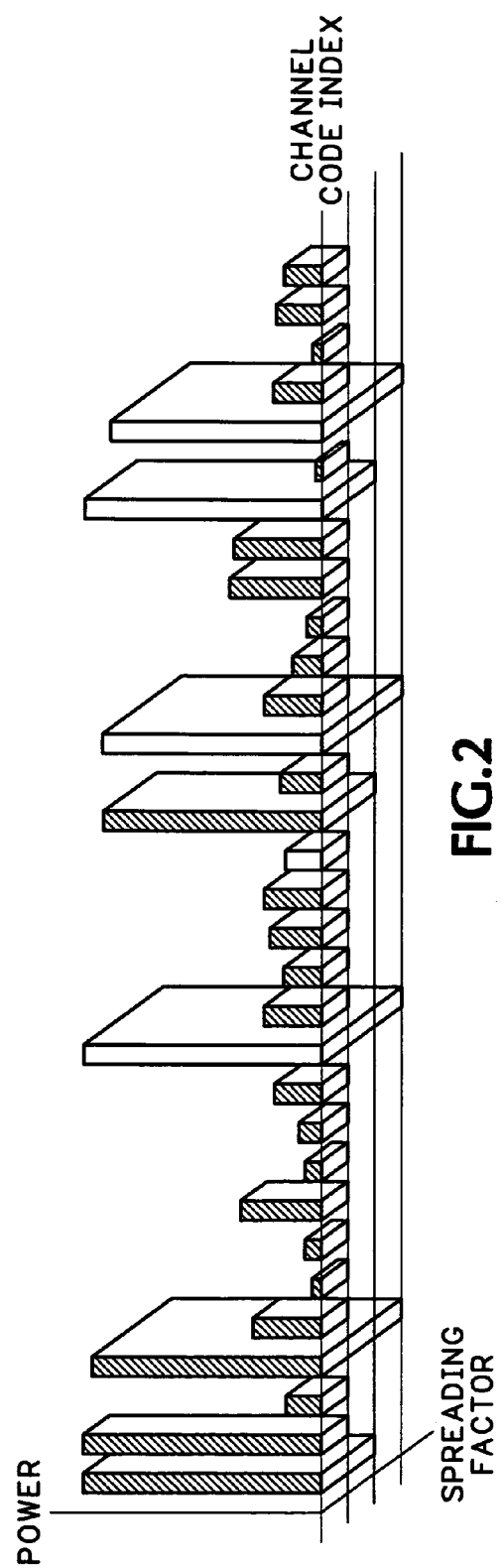
FIG. 2 is a graphic view of a three-dimensional CDP graph with sub-codes highlighted according to the present invention.

Referring now to FIG. 1 to a conventional code domain power (CDP) display having code power along the y-axis and channel code Index along the x-axis is added a third dimension along the z-axis or depth axis. The third axis represents spreading factor where a code domain multiple access (CDMA) signal has multiple spreading factors. Each code index is represented by a three-dimensional bar having a height representing the power at that code index and a depth representing the spreading factor for that code index. As shown in FIG. 2 sub-codes may be identified by any suitable means, such as highlighting by dimming them, changing their pattern, removing color, etc.

Figure 3:
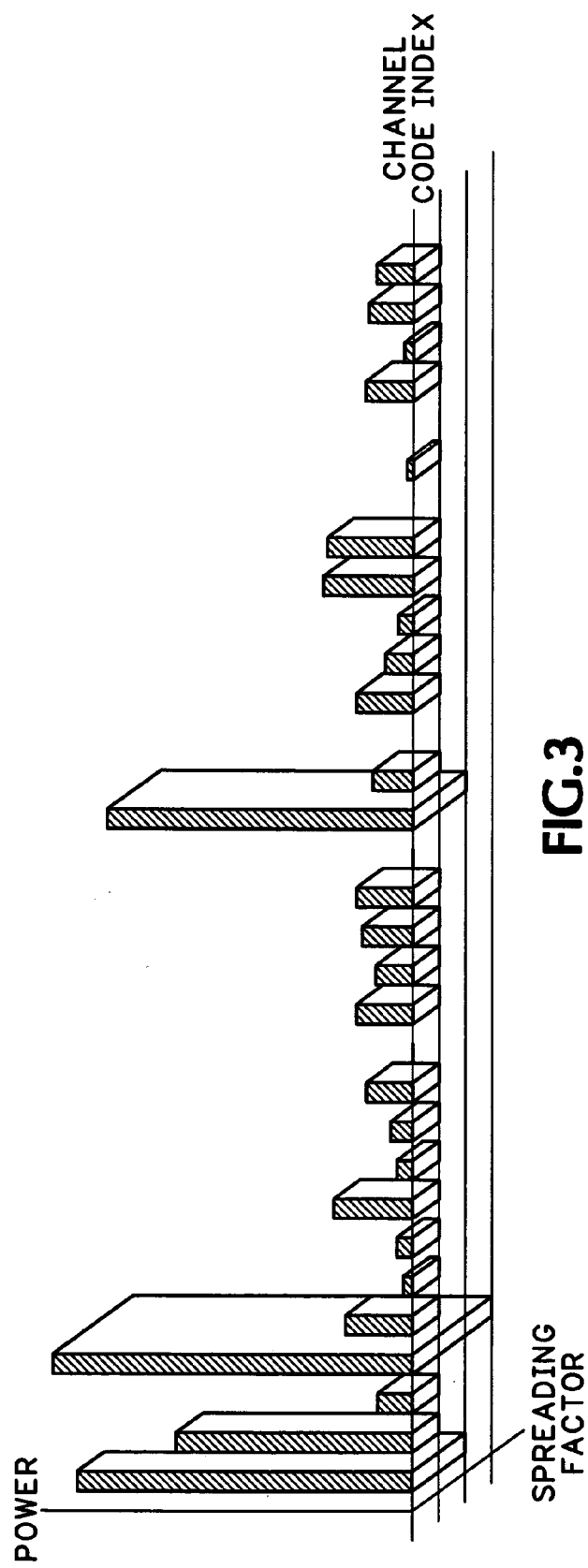
FIG. 3 is a graphic view of a three-dimensional CDP graph with sub-codes suppressed according to the present invention.

Further as shown in FIG. 3 the sub-codes may be suppressed, i.e., removed completely from the graph, leaving only the base codes displayed with empty holes where the sub-codes are unavailable. To indicate the power in each base code, its data column is made taller to correspond to its actual power, often calculated as the sum of its sub-codes. Removing sub-codes greatly simplifies the graph, allowing the user to quickly see which and how many codes are active and at what power.

Displaying this three-dimensional graph from the traditional perspective where the viewer looks into the graph space from the upper right causes the depth of shorter columns, i.e., less power, to be hidden behind taller data columns to their right. This problem is solved by rotating the graph so that the viewer sees the graph from the lower right, as shown in the various drawing Figures.

Thus the present invention provides a visualization of active codes, their spreading factors and power levels, in a code domain power display where the code domain multiple access signal has multiple spreading factors by adding a third, depth dimension to the standard two-dimensional CDP graph, the depth representing the spreading factors for the various active codes.

What is claimed is:

1. An improved method of displaying code domain power for a code domain multiple access signal having multiple spreading factors of the type where code domain power is displayed in a two-dimensional graph having code power as one axis and code index as the other axis comprising the step of adding a third axis representing spreading factor for each code index to provide a three-dimensional graph of code domain power.

2. The improved method of claim 1 further comprising the step of identifying sub-codes of a base code in the three-dimensional graph.

3. The improved method as recited in claim 2 wherein the identifying step comprises the step of highlighting the sub-codes.

4. The improved method as recited in claim 1 further comprising the steps of:
   deleting sub-codes of a base code in the three-dimensional graph; and
   adjusting a power level for the base code to represent the total power in the base code and the sub-codes.

5. An improved means for displaying code domain power for a code domain multiple access signal having multiple spreading factors of the type where code domain power is displayed in a two-dimensional graph having code power as one axis and code index as the other axis comprising means for adding a third axis representing spreading factor for each code index to provide a three-dimensional graph of code domain power.

6. The improved means as recited in claim 5 further comprising means for identifying sub-codes of a base code in the three-dimensional graph.

7. The improved means as recited in claim 6 wherein the identifying means comprises means for highlighting the sub-codes.

8. The improved means as recited in claim 5 further comprising:
   means for deleting sub-codes of a base code in the three-dimensional graph; and
   means for adjusting a power level for the base code to represent the total power in the base code and the sub-codes.

9. A display of code domain power for a code domain multiple access signal having multiple spreading factors comprises a three-dimensional graphic having a first axis representing code power, a second axis representing code index and a third axis representing spreading factor for the code domain multiple access signal.

10. The display as recited in claim 9 wherein sub-codes of a base code are identified in the three-dimensional graphic.

11. The display as recited in claim 10 wherein the identified sub-codes are highlighted.

12. The display as recited in claim 9 wherein sub-codes of a base code are suppressed and power levels of the base code are adjusted to reflect total power for the base code.

* * * * *